(12) United States Patent
Escolano et al.

(10) Patent No.: US 8,192,037 B2
(45) Date of Patent: Jun. 5, 2012

(54) CORRECTION AND FOCUSING DEVICE FOR A BEAM

(75) Inventors: Lionnel Escolano, Siarrouey (FR); Paul Sauvageot, Camales (FR)

(73) Assignee: ISP System, Vic-en-Bigorre (FR)

( * ) Notice: Subject to any disclaimer, the term of this patent is extended or adjusted under 35 U.S.C. 154(b) by 431 days.

(21) Appl. No.: 12/457,030

(22) Filed: May 29, 2009

(65) Prior Publication Data

US 2009/0237822 A1 Sep. 24, 2009

(51) Int. Cl.
*G02B 5/08* (2006.01)
(52) U.S. Cl. ...................................................... 359/846
(58) Field of Classification Search .... 359/212.1–214.1, 359/223.1–226.1, 871, 872
See application file for complete search history.

(56) References Cited

U.S. PATENT DOCUMENTS

| | | | | |
|---|---|---|---|---|
| 5,969,892 | A | * | 10/1999 | Slusher .......................... 359/872 |
| 6,478,434 | B1 | * | 11/2002 | Streetman et al. ............. 359/872 |
| 7,336,408 | B2 | * | 2/2008 | Oshima et al. ............. 359/224.1 |
| 2004/0085657 | A1 | | 5/2004 | Gullapalli et al. |
| 2004/0202898 | A1 | | 10/2004 | Van Dijsseldonk et al. |

FOREIGN PATENT DOCUMENTS

| | | |
|---|---|---|
| EP | 1 563 205 A1 | 8/2005 |
| JP | A-2002-173096 | 6/2002 |

* cited by examiner

*Primary Examiner* — Euncha Cherry
(74) *Attorney, Agent, or Firm* — Oliff & Berridge, PLC

(57) ABSTRACT

A correction and focusing device for a beam, through the deformation of a mirror, wherein it incorporates a frame supporting the mirror, at least one curve generator applying at least one torque to at least one extremity of the mirror, and correction actuators spaced along the mirror so as to apply stresses to the different zones of the mirror.

9 Claims, 4 Drawing Sheets

CORRECTION AND FOCUSING DEVICE FOR A BEAM

BACKGROUND OF THE INVENTION

1. Field of the Invention

The technical scope of the present invention is that of active mirrors, that is to say mirrors whose curvature can be modified to constitute a device to correct and focus a beam (for example a light beam, laser or other radiation).

2. Description of the Related Art

Active mirrors are essentially used in the optical domain (telescopes, microscopes) or in the domain of advanced research (synchrotrons). Active mirrors reflect an incident, oblique beam, normal to the mirror surface or inclined at any angle. In these specific domains, a mirror is sought to be deformed so as to focus the light beam, to correct an aberration of the beam or to correct a defect in the mirror.

The local modification of the slope of the mirror is moderate (around a few milliradians to one microradian). Moreover, the mirrors are generally made of a thin plate of a fragile material (for example silicon) whose thickness does not exceed 20 to 30 mm. It is, therefore, essential for the deformations of the mirror to be extremely accurate and precise (the stress applied being generally of between 1 and 100N).

Different active modification devices for the geometry of a mirror are known. A first type of device is that which implements piezoelectric or ferroelectric actuators. These actuators are spaced along and bonded to the mirror and enable a displacement of the portion of mirror to which they are bonded. Such devices nevertheless suffer from several drawbacks. A first drawback lies in the fact that piezoelectric actuators do not generate a stress but a displacement. Another drawback lies in the fact that keeping these actuators in position requires a constant supply of electricity and a closed loop control system. Another drawback is linked to the materials implemented, such as PZT ceramic, which generates a high level of hysteresis (of around 10 to 20%). Lastly, another drawback lies in the fact that the actuators are bonded on the mirror, thereby increasing the local rigidity of the mirror and making the structure heterogeneous. Such a structure generates local defects on the electrodes and the inter-actuator couplings. These local defects are translated by a line and grid effect that affects the reflected beam.

Another type of device is that in which two different torques are applied on either side of the mirror so as to cause an elliptical deformation of the mirror. The torques applied are generated by lever arms or strip springs. Such devices are not adapted, however, to thin mirrors of large dimensions. Indeed, it becomes very difficult to control any errors in the slope of the mirror in zones at a distance from the torque application points. Furthermore, the geometries made with such devices are necessarily simple geometry of the elliptical type. Nor do such devices allow the mirror's defects to be corrected, requiring the use of a mirror of excellent optical quality.

SUMMARY OF THE INVENTION

The aim of the present invention is thus to supply a device that does not suffer from such drawbacks but which enables a beam to be corrected and focused through the deformation of a mirror.

The invention thus relates to a correction and focusing device for a beam, through the deformation of a mirror, wherein it incorporates a frame supporting the mirror, at least one curve generator applying at least one torque to at least one extremity of the mirror, and correction actuators spaced along the mirror so as to apply stresses to the different zones of the mirror.

According to one characteristic of the invention, the frame supports the mirror at its two extremities, the first extremity being linked to the frame by a pivot link with a horizontal shaft and the second extremity being linked to the frame by a link of the double pivot link type with parallel shafts.

According to another characteristic of the invention, the double pivot link is made by means of a strip incorporating strictions.

According to yet another characteristic of the invention, the torque is applied to the mirror at its first extremity supported by the pivot link.

According to another characteristic of the invention, the first extremity of the mirror is held by jaws onto which a lever arm is attached and the curvature generator is made by means of a stress generator applying stress to the lever arm, orthogonal to the axis of the pivot link.

According to another characteristic of the invention, each correction actuator is in the form of a stress generator incorporating a body integral with the frame and a floating head, fixed to the mirror and only subject to correction stress.

According to another characteristic of the invention, each floating head is fixed to the mirror by means of at least one deformable footplate.

The invention also relates to a correction and focusing process for a beam that implements a device such as that described previously, such process wherein the two extremities of a mirror are linked to a frame and wherein a torque is applied to a single extremity of the mirror and at least one correction stress is applied between the two extremities of the mirror.

A first advantage of the device according to the invention lies in the fact that it enables profiles of complex geometry to be generated and any defects in the mirror and/or aberrations of the beam to be corrected.

Another advantage lies in the fact that the device according to the invention enables positive or negative stresses to be generated on the mirror.

Another advantage lies in the fact that the device according to the invention enables great stability of the mirror's geometry to be obtained, even in the absence of an electric power supply.

Lastly, another advantage of the device lies in the fact that it enables a wide range of curves with precise adjustments to be obtained.

BRIEF DESCRIPTION OF THE DRAWINGS

Other characteristics, particulars and advantages of the invention will become more apparent from the description given hereafter by way of illustration and with reference to the drawings, in which.

DETAILED DESCRIPTION OF PREFERRED EMBODIMENTS

The device according to the invention is adapted for the correction and deformation of a plane mirror or one which has initial curving. It is also adapted to all geometries of mirror, for example rectangular, trapezoidal or torpedo-shaped. However, for the sake of clarity and comprehension of the general principle behind the invention, the embodiments shown implement a substantially plane mirror that is horizontal in it starting position. All the Figures shall take as their reference the references linked to the mirror where axis x is the axis corresponding to the mirror's length (its greatest dimension), axis y is the mirror's width and axis z its height (or thickness). We will designate by X1, X2 or X3 (respectively Y1, Y2, Y3 and Z1, Z2, Z3) the axes parallel to axis x (respectively y and z).

Figure 1:
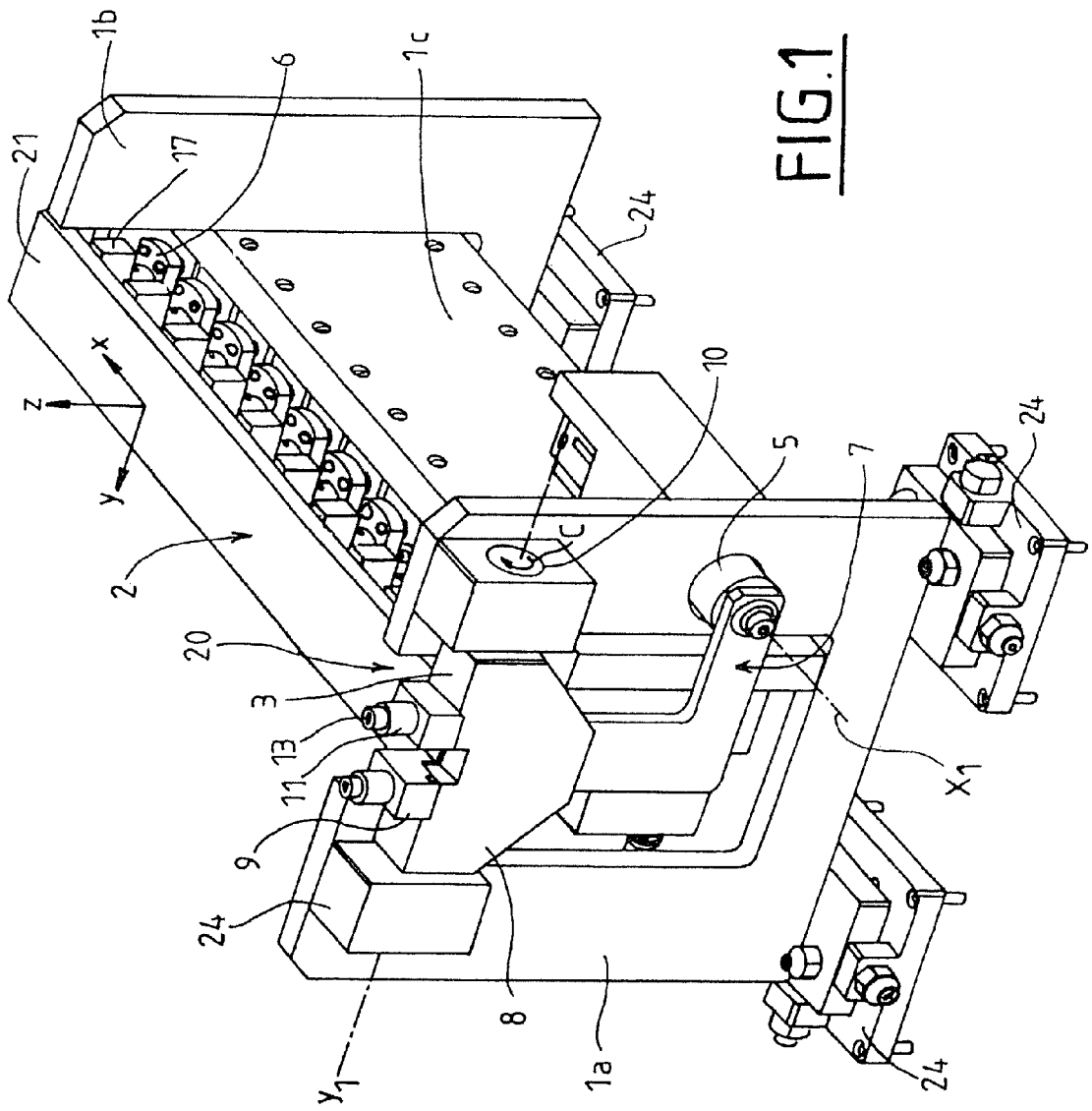
FIG. 1 shows a three-quarter face view of a mirror correction and deformation device according to the invention.

FIG. 1 shows a three-quarter face view of an embodiment of a mirror correction and deformation device according to the invention. In this embodiment, the device incorporates a frame 1 onto which the mirror 2 is fixed, a single curve generator applying a torque C to one extremity 20 of the mirror 2 and several correction actuators 6, spaced along the mirror so as to apply stresses to different zones of the mirror 2 by means of footplates 17.

The frame 1 incorporates two lateral walls 1a and 1b made integral with each other by means of an intermediate wall 1c. The frame 1 also incorporates feet 24 enabling it to be fastened to a stand. The frame 1 supports the mirror 2 at its two extremities 20 and 21. The first extremity 20 of the mirror is positioned between two jaws 8 and 9, which are tightened by screws 13. Flexible washers 11 are placed between each screw head and the upper jaw 9. The lower jaw 8 is linked to the frame 1 by a pivot link with axis Y1 made by means of two shafts 10 pivoting in rolling bearing cases 24 integral with the frame 1. Such an arrangement advantageously enables a pivot link 10 to be made with axis Y1 between the first extremity 20 of the mirror and the frame 1. A lever arm 7 is fixed to the lower jaw 8 and is subjected to the action of a stress generator 5 along an axis X1. Thus, the curve generator is made by combining the stress generator 5 with the lever arm 7. The stress generator 5 is fixed onto the intermediate wall 1c. The intermediate wall 1c also supports the correction actuators 6.

Figure 2:
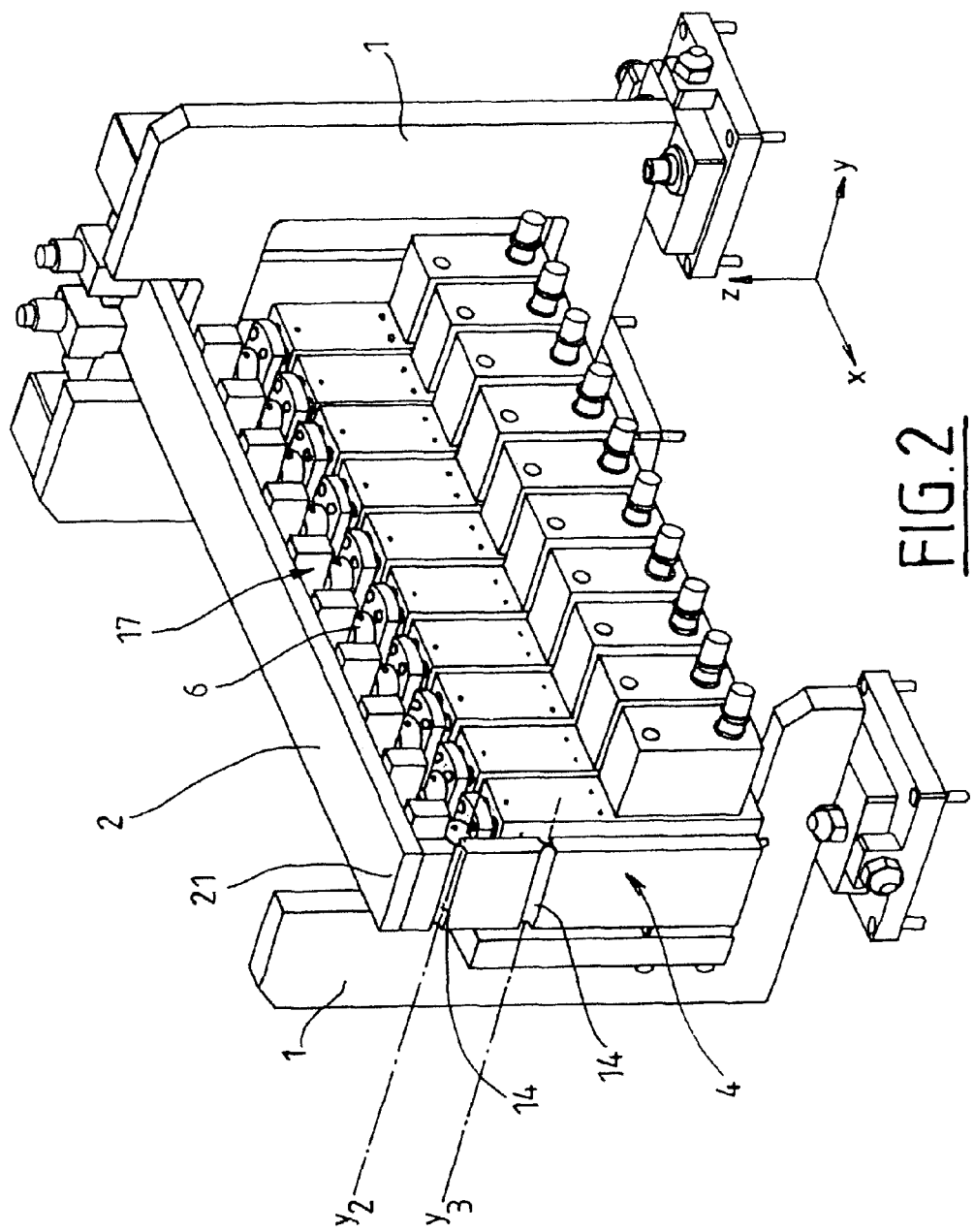
FIG. 2 shows a three-quarter rear view of a mirror correction and deformation device according to the invention.

FIG. 2 shows a three-quarter rear view of an embodiment of the mirror correction and deformation device according to the invention. The second extremity 21 of the mirror 2 is supported by a strip 4. The strip 4 incorporates strictions 14 so as to make a link of the double pivot type with parallel axes between the mirror 2 and the frame 1. The operating principle of this strip 4 will be described later with reference to FIGS. 5a and 5b. The actuators 6 are arranged between the two extremities 20 and 21 of the mirror so as to apply stresses to the different zones of the mirror 2. Footplates 17 are positioned between each actuator 6 and the mirror 2.

This embodiment of the invention thus implements a single curve generator applied to a single extremity of the mirror 2, which is the first extremity. This arrangement enables the structure to be simplified and a circular or elliptic shape to be obtained. According to another embodiment of the invention, however, it is possible for two curve generators to be implemented so as to apply two torques along two non-parallel axes (for example, a torque along axis Y1 and a torque along axis X3).

Figure 3:
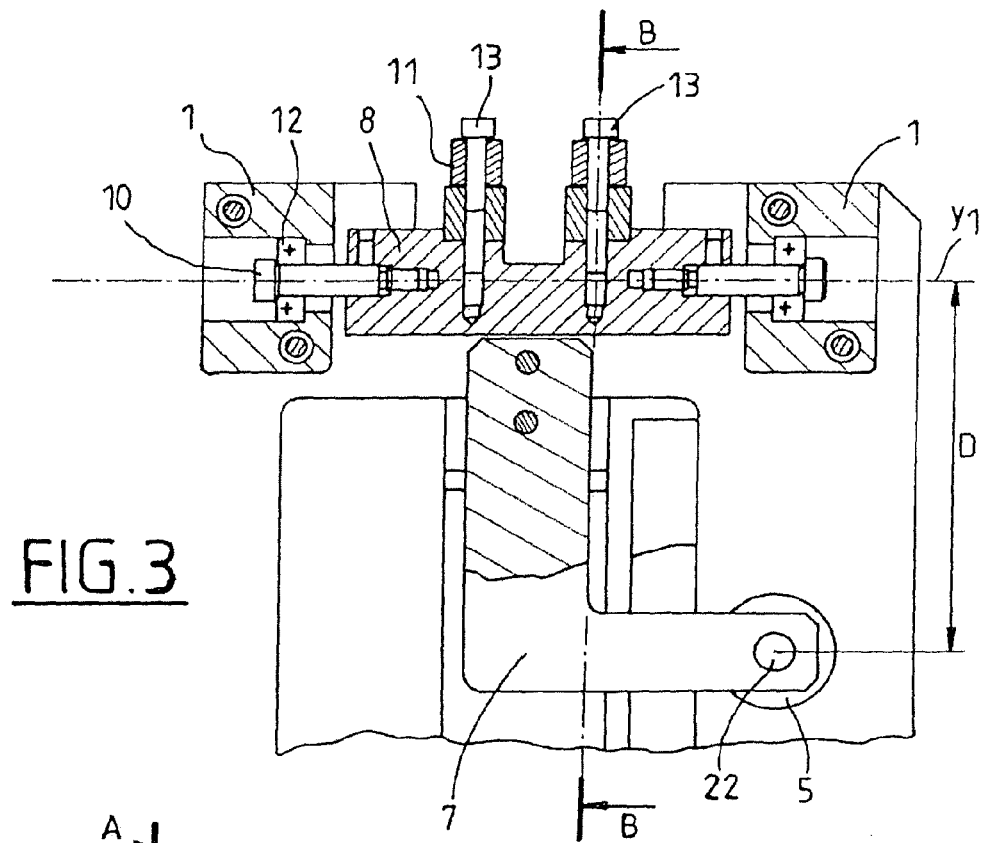
FIGS. 3 and 4 show section views of the attachment of a first extremity of the mirror to the frame.
Figure 4:
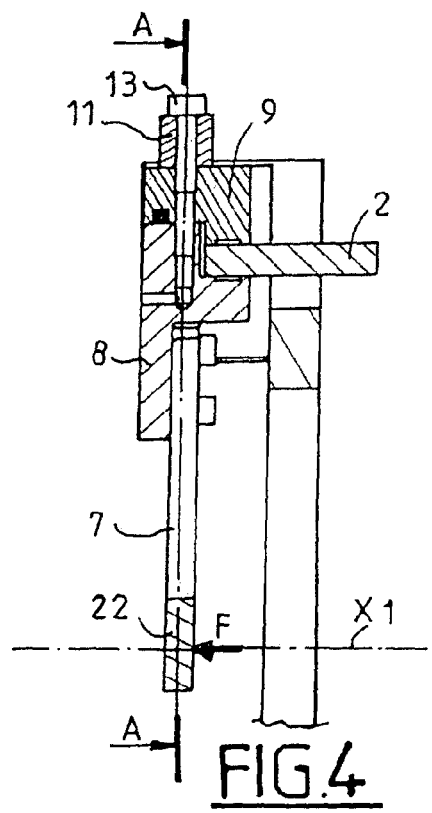

FIGS. 3 and 4 are vertical section views along planes AA and BB respectively illustrating how the mirror is held by the jaws 8 and 9 and the application of the torque C to the first extremity 20 of the mirror 2.

We can see in FIG. 3 that the lower jaw 8 is linked to the frame 1 by means of shafts 10 arranged on either side of the jaws and pivoting in rolling bearing cases 24 by means of rolling bearings 12 with an axis of rotation Y1. The use of rolling bearing cases 24 is given here by way of illustration. Naturally, the invention may be made using plain bearings or any other type of means enabling a pivot link to be made between the jaws and the frame 1. The screws 13 pass through the upper jaw 9 and are screwed in a thread in the lower jaw 8. The flexible washers 11 are placed between each screw head 13 and the upper jaw 9 so as to exert a controlled and constant tightening stress keeping the jaws closed tight. The lever arm 7 is attached to the lower jaw 8 at its lower part and is subjected to the action of a stress generator 5 at a point 22 and along an axis X1 orthogonal to the plane of the section. A distance D separates the point of application 22 of the stress generator 5 on the lever arm 7 and the axis of rotation Y1 of the jaw 8. The curve generator is made by combining the stress generator 5 with the lever arm 7. The stress F, orthogonal to the axis Y1 is thus transformed into a torque C along axis Y1. The value of the torque thus exerted is:

$$C = D*F$$

Figure 5A:
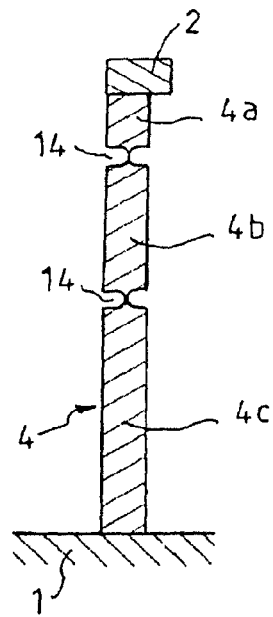
FIGS. 5a and 5b show section views of the attachment of the second extremity of the mirror on the frame.

FIG. 5a is a section view of the attachment of the second extremity 21 of the mirror 2 on the frame. The mirror 2 is attached (for example by bonding) to the strip 4. The strip 4 is arranged substantially vertically and incorporates three parts 4a, 4b and 4c separated by strictions 14. The upper part 4a of the strip is integral with the second extremity 21 of the mirror and the lower part 4c is integral with the frame 1 (not shown in this Figure). The strictions 14 enable each part of the strip to be linked whilst enabling each part to rotate with respect to the others along axes Y2 and Y3 parallel to the mirror's width and perpendicular to the plane of the section. Such an arrangement of the strip 4 advantageously enables a pivot type link with a double pivot horizontal axis to be obtained between the mirror 2 and the frame 1. By "double pivot link" we means a link made by two parallel pivots allowing a horizontal rotation and a horizontal movement orthogonal to the axis of rotation of the pivot. Indeed, when the mirror is curved, its two extremities tend to come closer together. Since the mirror is made of a fragile material, it is essential for a horizontal displacement to be allowed so as to prevent any stretch constraint on the mirror.

Figure 5B:
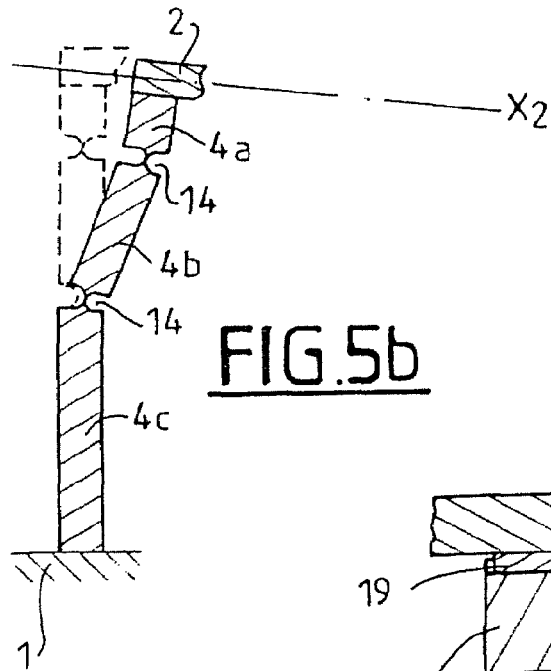

FIG. 5b is a similar view to view 5a, but representing the phase in which the mirror is subjected to a torque C. The starting position has been shown in dotted lines. We can note that the upper part 4a remains perpendicular to the mirror 2 and the lower part 4c remains immobile with respect to the frame 1. The median part 4b is inclined so as to enable the displacement and rotation of the mirror. Such a structure is close in its behavior to a so-called parallelogram hinge. In the drawing, the displacements of the mirror and strip have been exaggerated so as to better illustrate the functioning of the strip. In the actual conditions of use of the invention, these displacements are very slight. Since any vertical displacement is negligible, we can assimilate the final displacement to the combination of a rotation around axis Y2 and a horizontal translation along axis X2. Advantageously, the use of a strip with strictions enables an articulated link to be made using a single part.

Figure 6:
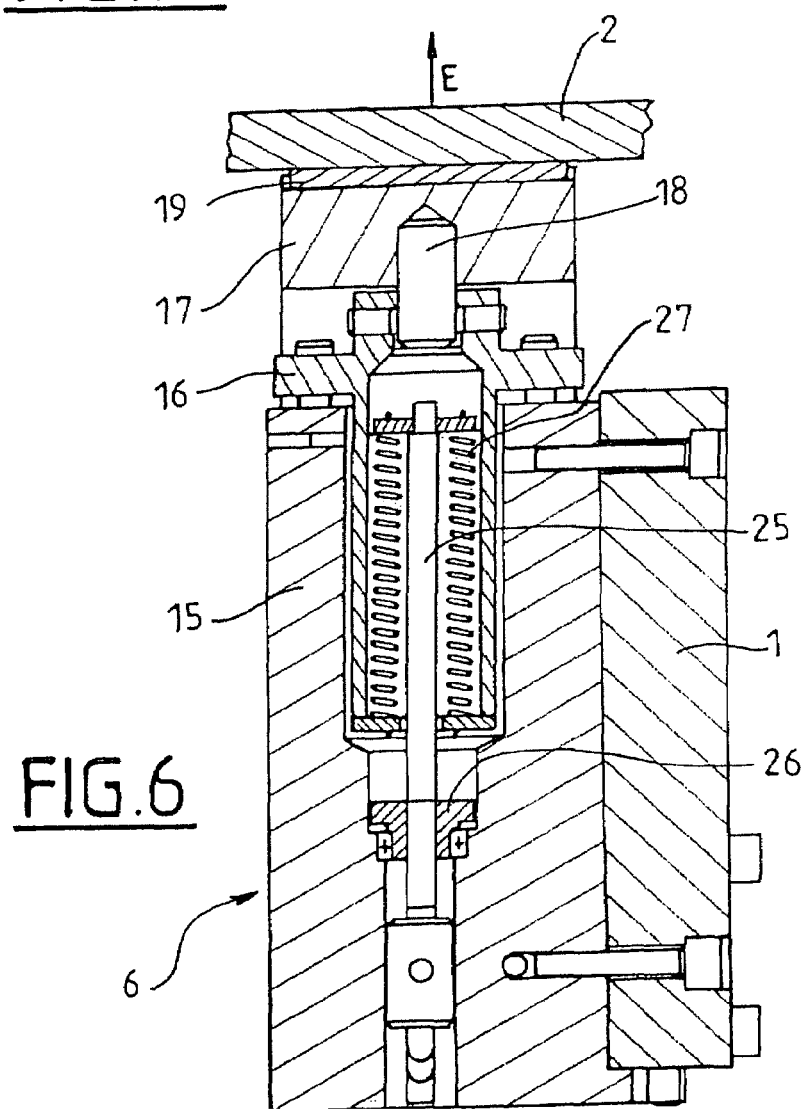
FIG. 6 shows a section view of a correction actuator acting on the mirror.

FIG. 6 is a section view showing a correction actuator acting on the mirror.

The correction actuator 6 is in the form of a mono-directional stress actuator incorporating a body 15 integral with the frame, a floating head 16, a threaded rod 25, a nut 26 and springs 27 connecting the floating head to the threaded rod and springs (not shown) connecting the floating head to the body 15. The head 16 of the actuator 6 is called "floating" since it is totally free in rotation and in translation and is only subject to stress E along the shaft 18 of the actuator. Such an actuator is already known and its mode of functioning is not the subject of the invention and thus does not require further description.

Reference may be made, however, to European patent EP1563205 that describes such an actuator and its mode of functioning.

The operating principle of such an actuator is as follows: the nut 26 is driven in rotation by motor means (not shown), the rotation of the nut causes a displacement of the rod 26 and the compression (or the stretching of the springs 27) which enables the creation of a micro stress. Such actuators have the advantage of being irreversible, which is to say that even when they are not being powered, they continue to exert a stress. The floating head 16 is attached to the mirror 2 and is only subjected to a correction stress E so as not to curb the displacements of the mirror 2. Preferentially, the floating head 16 is attached to the mirror 2 by means of a rigid footplate 17 (for example made of aluminum), covered by a deformable pad 19, for example in polyurethane. A finger 18 ensures the link between the floating head 16 and the footplate 17. Such an embodiment has the advantage of avoiding the formation of an imprint when the actuator exerts stress on the mirror. The device according to the invention comprises n actuators, the number n being defined by the dimensions of the mirror.

The device operates as follows: the two extremities 20 and 21 of the mirror 2 are fixed to the frame 1. The torque C to be applied to the mirror 2 is defined by calculation to give it a first curvature. From this calculation, the value of the stress F to be applied to the lever arm is deduced. Thereafter, the stresses $E_1$ to $E_n$ are defined to be applied by the n correction actuators 6 in order to reach the required curvature. Naturally, the torques and stresses to be applied to the mirror may be determined by other methods, for example by calibration or by acquisition. The actuators and torque generators may also be served-controlled by one or several servo loops. And the corrective stresses to be made to the actuators can be measured using sensors.

By means of a stress generator 5, stress F is applied to the lever arm 7. This stress F generates the torque C applied to the jaws 8 and 9 on the axis of rotation 10. Since the mirror is integral with the jaws at its first extremity 20, the torque C is thus transmitted to the extremity 20 of the mirror so as to generate a pre-curvature. Thereafter, a stress $E_1$ to $E_n$ (positive, negative or nil) is applied at each of the n correction actuators 6 so as to modify the general and/or local curvature of the mirror. The mirror's geometric profile may thus be modeled by the sum of the torques and stresses applied to the mirror between its two extremities. Thus, a positive or negative stress can increase or reduce the local curvature and a nil stress conserves the slope of the mirror.

Thus, in the invention, the curvature of the mirror is not defined by the displacement of the actuators but by the combination of a torque and stresses applied to the mirror, as well as by the mirror's own properties, which is to say its elasticity.

Corrections may also be made by the stress on one or several actuators so as to correct a defect in the mirror or in the reflected beam.

The invention also relates to a correction and deformation process for a mirror implementing a device such as that described here above. According to this process, the two extremities 20 and 21 of the mirror 2 are linked to a frame 1 and a torque C is applied to one extremity 20 only of the mirror and at least one correction stress E is applied between the two extremities 20 and 21 of the mirror 2 so as to correct the mirror's geometry.

The mirror shown in this example is a silicon mirror, rectangular, with a length of 320 mm, a width of 40 mm and a thickness of 8 mm. Such a mirror will be associated with a curvature actuator and ten correction actuators and will enable an elliptic curvature with a radius of 50 m to be obtained with accuracy such that errors of shape will be reduced to less than 0.5 μrad.

The invention may naturally be applied to non-plane mirrors having an initial curvature, and to torpedo-shaped or trapezoidal mirrors. A correction and deformation device for a mirror may also be made that does not incorporate any curvature generators or that incorporate a curvature generator at each extremity of the mirror. Lastly, in the Figures illustrating the invention, the correction actuators 6 have been shown as being positioned in a line, the invention may naturally be embodied by implementing actuators spaced in several parallel lines or spaced in staggered rows.

What is claimed is:

1. A correction and focusing device for a beam, through the deformation of a mirror, wherein said device incorporates a frame supporting the mirror, at least one curve generator applying at least one torque to at least one extremity of said mirror, and correction actuators spaced along the mirror so as to apply stresses to the different zones of the mirror.

2. A correction and focusing device for a beam according to claim 1, wherein said frame supports said mirror at its two extremities, said first extremity being linked to said frame by a pivot link with a horizontal axis and said second extremity being linked to the frame by a double pivot link with parallel axes.

3. A correction and focusing device for a beam according to claim 2, wherein said double pivot link is made by means of a strip incorporating strictions.

4. A correction and focusing device for a beam according to claim 2, wherein said torque is applied to said mirror at its first extremity supported by the pivot link.

5. A correction and focusing device for a beam according to claim 4, wherein said first extremity of said mirror is held by jaws onto which a lever arm is attached and said curvature generator is made by means of a stress generator applying stress to said lever arm, orthogonal to the axis of said pivot link.

6. A correction and focusing device for a beam according to claim 1, wherein each of said correction actuators is in the form of a stress generator incorporating a body integral with said frame and a floating head, fixed to said mirror and only subject to correction stress.

7. A correction and focusing device for a beam according to claim 6, wherein each of said floating heads is fixed to said mirror by means of at least one deformable footplate.

8. A correction and focusing device for a beam according to claim 5, wherein each of said correction actuators is in the form of a stress generator incorporating a body integral with said frame and a floating head, fixed to said mirror and only subject to correction stress.

9. A correction and focusing process for a beam that implements a device according to claim 2, wherein said two extremities of said mirror are linked to a frame and wherein a torque is applied to a single extremity of said mirror and at least one correction stress is applied between said two extremities of said mirror.

* * * * *